United States Patent Office 3,177,210
Patented Apr. 6, 1965

3,177,210
PROCESS FOR PREPARING CYANINE SPECTRAL SENSITIZING DYES
Alan E. Rosenoff, Framingham, Mass., assignor to Polaroid Corporation, Cambridge, Mass., a corporation of Delaware
No Drawing. Filed Nov. 29, 1962, Ser. No. 241,024
4 Claims. (Cl. 260—240.65)

This invention relates to chemistry and more particularly to novel chemical syntheses.

A principal object of the present invention is to provide novel methods for the preparation of certain compounds set forth hereinafter.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

In accordance with the present methods, photographic spectral (optical) sensitizing agents, that is, cyanine dyes of the formula:

(I)  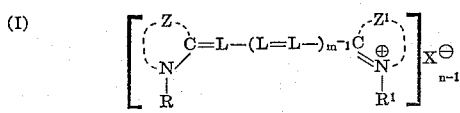

wherein L represents a methine group such as —CH=; —C(CH$_3$)=, etc., groups; R is a γ-sulfopropyl group; R$^1$ represents an alkyl group such as methyl, ethyl, n-propyl, isobutyl, n-butyl, allyl, β-methallyl, β-methoxyethyl, β-ethoxyethyl, β-hydroxyethyl, β-hydroxypropyl, γ-hydroxyethly, benzyl, β-phenethyl, carboxymethyl, α-carboxyethyl, β-carboxyethyl, γ-carboxypropyl, δ-carboxybutyl, sulfomethyl, β-sulfoethyl, γ-sulfopropyl, δ-sulfobutyl, p-sulfobenzyl, carbmethoxymethyl, β-carbmethoxyethyl, carbethoxymethyl, β-carbethoxyethyl, etc., preferably containing not more than 5 carbon atoms; Z represents the atoms necessary to complete a heterocyclic ring system of the β-naphthothiazole, β-naphthoselenazole, β-naphthoxazole, or β-naphthimidazole series; Z$^1$ represents the atoms necessary to complete a heterocyclic ring system of the benzotriazole, benzoselenazole, benzoxazole, benzimidazole, β-naphthothiazole, β-naphthoselenazole, β-naphthoxazole, or β-naphthimidazole series; m represents a positive integer of from 1 to 3, inclusive; n represents a positive integer from 1 to 2, inclusive; and X represents an anion; may be prepared by condensing a 2-alkyl-β-naphthothiazole, 2-alkyl-β-naphthoselenazole, 2-alkyl-β-naphthoxazole, or 2-alkyl-β-naphthimidazole wherein said alkyl group is a lower alkyl group, preferably containing from 1 to 3 carbon atoms such as methyl, ethyl and propyl, with 1,3-propane sultone to provide respectively, a 2-alkyl-3-(γ-sulfopropyl)-β-naphthothiazolium betaine, 2-alkyl-3-(γ-sulfopropyl)-β-naphthoselenazolium betaine, 2-alkyl-3-(γ-sulfopropyl)-β-naphthoxazolium betaine, or 2-alkyl-3-(γ-sulfopropyl)-β-naphthimidazolium betaine, and then:

(1) condensing, in the presence of a base, the thus-prepared cycloammonium quaternary salt with the corresponding 2-halo, 2-alkylmercapto or 2-arylmercapto derivative thereof to provide compounds of Formula I wherein m=1; R and R$^1$ are each a γ-sulfopropyl group; and Z and Z$^1$ are identical and each represents the atoms necessary to complete a heterocyclic ring system of the β-naphthothiazole, β-naphthoselenazole, β-naphthoxazole, or β-naphthimidazole series;

(2) condensing, in the presence of a base, the thus-prepared cycloammonium quaternary salt with a 2-(halo, alkylmercapto or arylmercapto)-3-alkyl cycloammonium quaternary salt of the benzothiazole, benzoselenazole, benzoxazole, benzimidazole, β-naphthothiazole, β-naphthoselenazole, β-naphthoxazole, or β-naphthimidazole series, wherein the alkyl substituent on the nitrogen atom and/or the heterocyclic ring system of the second salt is different from that of the first salt, to provide compounds of Formula I wherein m=1; R and R$^1$ and/or Z and Z$^1$ are different;

(3) condensing, in the presence of a base, the thus-prepared cycloammonium quaternary salt with an ester of an orthocarboxylic acid to provide compounds of the Formula I wherein m=2; R and R$^1$ are identical; and Z and Z$^1$ are identical;

(4) condensing, in the absence of a base, the thus-prepared cycloammonium quaternary salt with an amidine such as N,N-diphenylformamidine, or with an ester of an orthocarboxylic acid, and then directly condensing the product thereof, in the presence of a base, with a second 2,3-bis-alkyl substituted cycloammonium quaternary salt, most preferably as the methylene base thereof, wherein the alkyl substituent on the nitrogen atom and/or the heterocyclic ring system of the second salt is different from that of the first salt, within the limits of the definitions previously afforded R$^1$ and Z$^1$, to provide compounds of Formula I wherein m=2; and R and R$^1$ and/or Z and Z$^1$ are different;

(5) condensing, in the presence of a base, the thus-prepared cycloammonium quaternary salt with a β-arylaminoacrolein anil salt or a 1,1,3,3-tetraalkoxypropane to provide compounds of Formula I wherein m=3; R and R$^1$ are identical; and Z and Z$^1$ are identical; or (6) condensing, in the absence of a base, the thus-prepared cycloammonium quaternary salt with a β-arylaminoacrolein anil salt and then directly condensing the product thereof, in the presence of a base, with a second 2,3-bis-alkyl substituted cycloammonium quaternary salt of the series set forth in section (4), most preferably as the methylene base thereof, wherein the alkyl substituent on the nitrogen atom and/or the heterocyclic ring system is different, to provide compounds of Formula I wherein m=3; and R and R$^1$ and/or Z and Z$^1$ are different.

The heterocyclic ring systems of the formula may contain the substituents usual in the cyanine dye art, for example, substituents such as lower alkyl, lower alkoxy, benzyl, phenyl, naphthyl, chloro, bromo, iodo, amino, hydroxyl, cyano, etc.

As specific examples of the aforementioned heterocyclic ring systems, for use in the practice of the instant invention, mention may be made of: 6-methylbenzothiazole; 5-ethoxy-6-methylbenzothiazole; 5-methylbenzothiazole; 5-methoxybenzothiazole; 6-methoxybenzothiazole; 5-ethylbenzothiazole; 6-ethylbenzothiazole; 5-ethoxybenzothiazole; 6-ethoxybenzothiazole; 6-phenylbenzothiazole; 5,6-dichlorobenzothiazole; 5-chlorobenzothiazole; 5-bromobenzothiazole; 5-phenylbenzothiazole; 5-acetamidobenzothiazole; 5-iodobenzothiazole; 5-dimethylaminobenzothiazole; 5-chlorobenzoselenazole; 5-methoxybenzoselenazole; β-naphthothiazole; β-naphthoselenazole; 5-methylbenzoxazole; 5-bromobenzoxazole; 5-methoxybenzoxazole; 5-ethoxybenzoxazole; 5-chlorobenzoxazole; 5-phenylbenzoxazole; β-naphthoxazole; benzimidazole; β-naphthimidazole; 5-chlorobenzimidazole; 5,6-dichlorobenzimidazole; 5-phenylbenzimidazole etc., groups.

It will be appreciated that in the foregoing discussion, the conventional American system has been used in naming the heterocyclic ring systems corresponding to Z and Z¹ of Formula I. Under the system of nomenclature adopted by Chemical Abstracts, the naming of these groupings differs, to wit, β-naphthothiazole is named as naphtho[1,2-d]thiazole; β-naphthoselenazole, as naphtho[1,2-d]selenazole; β-naphthoxazole, as naphth[1,2-d]oxazole; and β-naphthimidazole, as naphth[1,2-d]imidazole. Similarly, 2-alkyl-β-naphthothiazole, 2-alkyl-β-naphthoselenazole, 2-alkyl-β-naphthoxazole, and 2-alkyl-β-naphthimidazole are named as 2-alkyl-naphtho[1,2-d]thiazole, 2-alkyl-naphtho[1,2-d]selenazole, 2-alkyl-naphth[1,2-d]oxazole, and 2-alkyl-naphth[1,2-d]imidazole, respectively; and 2-alkyl-3-(γ-sulfopropyl)-β-naphthothiazolium betaine, 2-alkyl-3-(γ-sulfopropyl)-β-naphthoselenazolium betaine, 2-alkyl-3-(γ-sulfopropyl)-β-naphthoxazolium betaine, and 2-alkyl-3-(γ-sulfopropyl)-β-naphthimidazolium betaine are named as 2-alkyl-3-(γ-sulfopropyl)-β-naphthimidazolium betaine are named as 2-alkyl-3-(γ-sulfopropyl)-naphtho[1,2-d]thiazolium inner salt, 2-alkyl-3-,γ-sulfopropyl)-naphtho[1,2-d]selenazolium inner salt, 2-alkyl-3-(γ-sulfopropyl)-naphth[1,2-d]oxazolium inner salt, and 2-alkyl-3-(γ-sulfopropyl)-naphth[1,2-d]imidazolium inner salt, respectively.

The anion, represented by the designation X in the formula, comprises those anionic acid radicals customary in the cyanine dye art, for example, chloride, bromide, iodide, methylsulfate, ethylsulfate, p-toluenesulfonate, benzenesulfonate, acetate, propionate, cyanate, perchlorate, etc.

The aforementioned base comprises a basic condensing agent such as an organic amine, for example tri-n-propylamine, tri-n-butylamine, triisoamylamine, triethylamine, trimehtylamine, dimethylaniline, diethylaniline, pyridine, N-alkyl-piperidine, etc., and most preferably an organic tertiary amine having a dissociation constant greater than pyridine (1×10⁻⁵); an alkali metal carboxylate in a carboxylic anhydride, for example, sodium acetate in acetic anhydride, etc.; or an alkali metal hydroxide, for example, sodium hydroxide, potassium hydroxide, etc. Preferably, the stated condensation reaction takes place in the presence of heat and in a substantially inert reaction medium such as lower molecular weight alcohol, for example, ethyl, n-propyl, isopropyl, n-butyl or isobutyl alcohol; tricresylphosphate; or a phenol; or a reaction medium itself comprising the condensating agent such as pyridine.

As examples of the aforementioned esters of ortho carboxylic acids, mention may be made of ethyl orthoformate, n-propyl orthoformate, ethyl orthoacetate, n-propyl orthoacetate, n-butyl orthoacetate, ethyl orthopropionate, n-propyl orthopropionate, n-butyl orthopropionate, ethyl orthobenzoate, etc., preferably in a reaction medium such as pyridine, etc.

Employing the aforementioned orthoacetate, orthopropionate, orthobenzoate, etc., esters instead of orthoformate esters provide a mechanism for producing trimethine or carbocyanine compounds containing a substituent such as methyl, ethyl, phenyl, etc., at the central carbon atom or meso position of the trimethylene chain.

Specifically preferred compounds within Formula I comprise symmetrical trimethine or carbocyanine dyes of the formula:

(II)

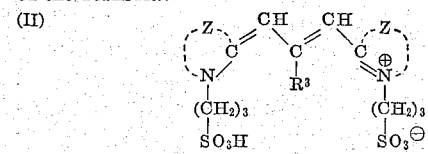

wherein R³ represents a hydrogen atom, a phenyl group, or a lower alkyl group such as methyl, ethyl, propyl, etc.

Compounds within Formula II may be prepared by condensing a compound of the formula:

(III)

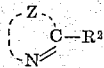

wherein R² is an alkyl group comprising from 1 to 3 carbon atoms, that is, a methyl, ethyl or propyl group; with 1,3-propane sultone, preferably at a temperature within the range of 80° to 150° C. to provide a compound of the formula:

(IV)

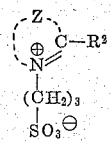

which product is then condensed, in a molar ratio of 2:1, with an ester of an orthocarboxylic acid of the formula:

(V)      $R^3$—$C(OR^4)_3$ 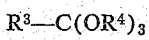

wherein R³ represents a hydrogen atom, a phenyl group or an alkyl group, preferably a lower alkyl group such as methyl, ethyl, etc.; and R⁴ represents an alkyl group, preferably a lower alkyl group such as methyl, ethyl, etc.

Preferred compounds within Formula II may be represented by the formula:

(VI)

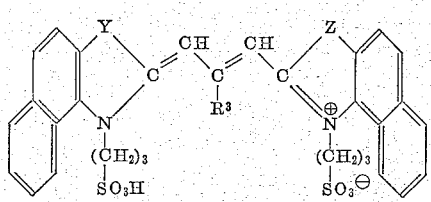

wherein each Y is the same and represents a sulfur, selenium, oxygen or nitrogen atom.

The invention will be illustrated in greater detail in connection with the following specific examples which set out a representative synthetic procedure of this invention and a representative utilization of the thus-prepared product, which, however, are not limited to the details therein set forth and are intended to be illustrative only.

*Example 1*

A carbocyanine sensitizing dye of the formula

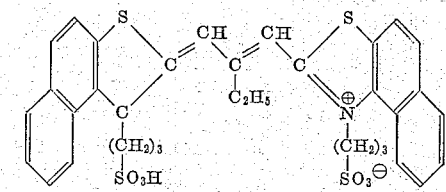

Anhydro-4,5,4′,5′-dibenzo-9-ethyl-3,3′-bis-(γ-sulfopropyl)-thiacarbocyanine hydroxide was prepared as follows:

A mixture comprising 19.9 grams (0.10 mole) of 2-methylnaphtho[1,2-d]thiazole and 24.4 grams (0.20 mole) of 1,3-propane sultone was heated at 150° C. for 2 days. The product, 2-methyl-3-(γ-sulfopropyl)-naphtho[1,2-d]thiazolium inner salt, a solid mass of crystals was ground to a powder under a mixture of acetone and methanol, collected, washed with acetone, rewashed with anhydrous ether, and then dried under vacuum.

The product, a tan powder, was obtained in a yield equal to 100% of the theoretical yield and purified by boiling 20.0 grams with 750 cc. of water for 1 hour, filtering the resultant dark brown solution through Celite, refrigerating the filtrate, and then collecting the needle-type crystals which separated from solution. The crystals were washed with cold water and acetone and dried.

A yield equal to 77% of the theoretical yield was obtained and the product exhibited a melting point at 268–269° C.

Elemental analysis of the product revealed:

|            | C    | H   | N   | S    |
|------------|------|-----|-----|------|
| Calculated | 53.1 | 5.1 | 4.1 | 18.9 |
| Found      | 52.9 | 5.1 | 4.1 | 18.6 |

4.90 grams (0.0152 mole) of the product was then warmed with 10 grams of phenol until a clear pale yellow solution was obtained. 4.93 grams (0.0304 mole) of triethyl orthopropionate was added to the solution. To the resultant dark yellow solution, 1.54 grams (0.0152 mole) of triethylamine was added and the resultant blue-magenta mixture heated at 120° C. for 1.5 hours. The resultant intense purple solution was then cooled to 60° C. and 750 cc. of acetone was added to precipitate the dye. After the solution cooled, the precipitate was separated, washed with acetone, washed with ether and then dried. A yield equal to 85.5% of the theoretical yield was obtained and the dye exhibited a $\lambda_{max.}$ at 574 m$\mu$ in methanol.

*Example 2*

1.5 cc. of a solution comprising 1 mg. of the dye of Example 1 per cc. of methanol were added, at 38° C., to 7.5 grams of a silver iodobromide emulsion containing 1.0 grams of silver and the mixture stirred thoroughly. To the resultant sensitized emulsion were added, with constant stirring, 1.4 cc. of 10% saponin, 1.4 cc. of 10% sodium N-methyl-N-oleyl taurate, and 0.5 cc. of 1% acetic acid. The resultant emulsion was then coated on a gelatin-subcoated cellulose triacetate film base.

The product was then exposed in a wedge spectrograph, developed, and the resultant wedge spectrogram exhibited the conventional spectral sensitivity pattern indicative of the cyanine dye product.

For the preparation of spectrally sensitized photographic silver halide gelatin emulsions, the sensitizing dyes of Formula I may be added to the emulsions in accordance with customary procedures, that is, by adding a solution of the sensitizing dye in an appropriate solvent to the emulsions. Solvents include water, methanol, ethanol, pyridine, acetone, etc., or mixtures of such solvents. The amount of cyanine sensitizing dye employed may be varied, depending upon the characteristics of the particular silver halide emulsion employed, results desired, etc. In general, from about 5 to 100 mg. of dye per liter of silver halide emulsion is sufficient to obtain maximum sensitization.

The synthetic methods of the instant invention provide the unexpected advantages of producing the stated products in extremely high yields, see, for example, the illustrative example, wherein a yield of the stated cyclo-ammonium quaternary salt was obtained in the order of 100% of the theoretical yield possible.

This is in clear contradistinction to conventional procedures of condensing a compound of Formula III with a halogenated alkyl sulfonic or fatty acid such as 2-bromo-ethane sulfonic acid, 3-bromopropionic acid, bromo acetic acid, 4-bromobutyric acid, etc., which procedures I have found to provide extremely low yields, that is, yields in the order of less than 5% of theoretical, even under the most vigorous reaction conditions advisable.

Since certain changes may be made in the above process without departing from the scope of the invention herein involved, it is intended that all matter contained in the above description shall be interpreted as illustrative and not in a limiting sense.

What is claimed is:

1. The process of preparing compounds of the formula:

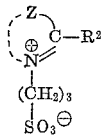

wherein Z represents the atoms necessary to complete a heterocyclic nucleus selected from the group consisting of a naptho[1,2-d]thiazole nucleus, a naphtho[1,2-d]selenazole nucleus, a naphth[1,2-d]oxazole nucleus, a naphth[1,2-d]oxazole nucleus, and a naphth[1,2-d]imidazole nucleus; and $R^2$ represents an alkyl group comprising from 1 to 3 carbon atoms, inclusive; which comprises the step of heating a compound of the formula:

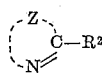

with 1,3-propane sultone.

2. The process as defined in claim 1, including the step of condensing the product thereof, in the presence of a basic condensing agent, with an orthoester of the formula:

$$R^3\!-\!C(OR^4)_3$$

wherein $R^3$ represents a member selected from the group consisting of hydrogen, phenyl, and lower alkyl, and $R^4$ is lower alkyl to provide a compound of the formula:

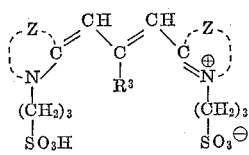

wherein $R^3$ is selected from the group consisting of hydrogen, a phenyl group and a lower alkyl group.

3. The process of preparing 2-methyl-3-(γ-sulfopropyl)-naptho[1,2-d]thiazolium inner salt which comprises heating 2-methyl-naptho[1,2-d]thiazole with 1,3-propane sultone.

4. The process of preparing anhydro-4,5,4',5'-dibenzo-9-methyl-3,3'-bis-(γ-sulfopropyl) - thiacarbocyanine hydroxide which comprises heating 2-methyl-naphtho[1,2-d]thiazole with 1,3-propane sultone to provide 2-methyl-3-(γ-sulfopropyl)-naphtho[1,2-d]thiazolium inner salt and then condensing the thus-prepared product, in the presence of a basic condensing agent with triethylorthopropionate.

References Cited in the file of this patent

UNITED STATES PATENTS

| 2,503,776 | Sprague | Apr. 11, 1950 |
| 2,921,067 | Larive et al. | Jan. 12, 1960 |

FOREIGN PATENTS

| 532,405   | Belgium       | Apr. 8, 1955  |
| 929,080   | Germany       | Aug. 16, 1955 |
| 1,028,718 | Germany       | Apr. 24, 1958 |
| 742,112   | Great Britain | Dec. 21, 1955 |

OTHER REFERENCES

Chemical Abstracts I, vol. 53, cols. 4983 and 4985 (1959) (abstracts of East German Patents 11,108 (Jan. 17, 1956), and 12,477 (Dec. 17, 1956), to Johannes Brunken and Gunther Bach).

Chemical Abstracts II, vol. 54, cols. 9577 to 9579 (1960) (abstract of East German Patent 15,119 (July 28, 1958) to Johannes Brunken and Joachim Müller).